March 19, 1929.  J. R. CAUTLEY  1,705,853
BRAKE APPLYING CONNECTION
Filed Oct. 24, 1925  2 Sheets-Sheet 1

INVENTOR
JOHN R. CAUTLEY
BY
ATTORNEY

March 19, 1929.　　　　J. R. CAUTLEY　　　　1,705,853
BRAKE APPLYING CONNECTION
Filed Oct. 24, 1925　　　2 Sheets-Sheet 2

INVENTOR
JOHN R. CAUTLEY
BY
M. W. McConkey
ATTORNEY

Patented Mar. 19, 1929.

1,705,853

UNITED STATES PATENT OFFICE.

JOHN R. CAUTLEY, OF SOUTH BEND, INDIANA, ASSIGNOR TO BENDIX BRAKE COMPANY, OF CHICAGO, ILLINOIS, A CORPORATION OF ILLINOIS.

BRAKE-APPLYING CONNECTION.

Application filed October 24, 1925. Serial No. 64,523.

This invention relates to brakes, and is illustrated as embodied in novel operating connections for an automobile front wheel brake. An object of the invention is to lessen the cost of such connections, and to minimize the necessity of lubrication, by reducing the number of parts and by arranging them in a novel manner.

One feature of the invention relates to supporting the inner end of the brake-operating shaft by a novel arm or equivalent member acting as a support for the shaft end, and secured to the chassis frame. Preferably this member is flexible, being for example a sheet metal stamping, and is secured at its end to the frame, so that it may bend to permit slight axial movement of the shaft to compensate for spring movement, thus eliminating entirely one of the joints that have heretofore been considered necessary. At its opposite end a half-socket is shown pressed, cooperating with a socket in a separate cap to receive a ball on the end of the shaft.

Another feature relates to a novel joint at the swivelling axis, including a yoke sleeved at its center on an arm at right angles to one shaft end and having arms straddling and pivoted to the other shaft end.

These and other features of the invention, including various novel combinations of parts and desirable particular constructions, will be apparent from the following description of one illustrative embodiment shown in the accompanying drawings, in which.

Figure 1:
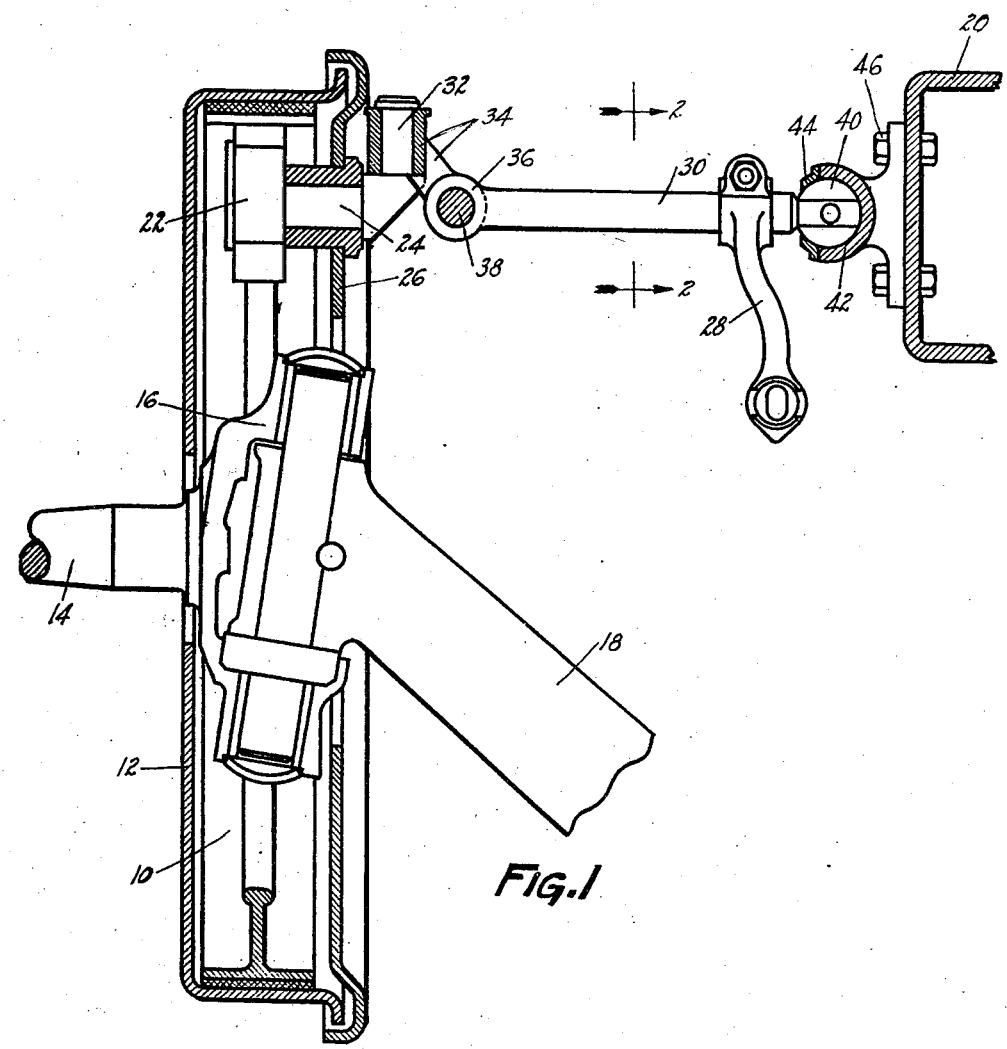
Fig. 1 is a vertical section through one front brake and associated parts.
Figure 2:
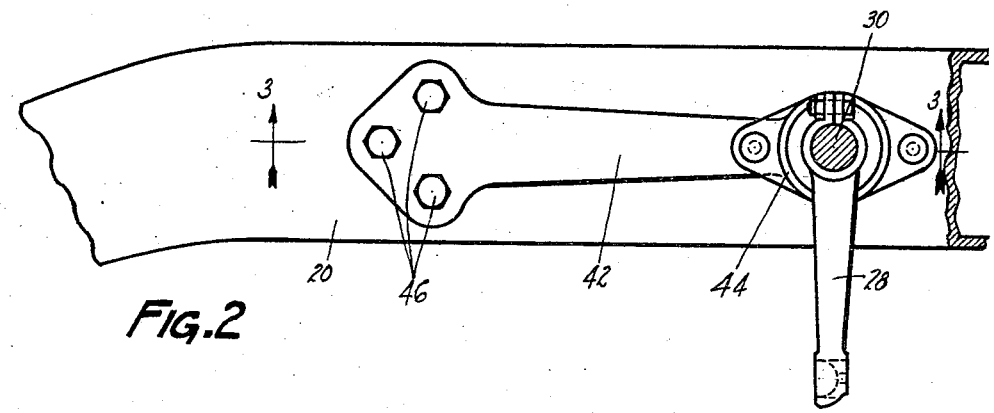
Fig. 2 is a vertical section on the line 2—2 of Fig. 1, showing the flexible shaft-supporting member in side elevation.
Figure 3:
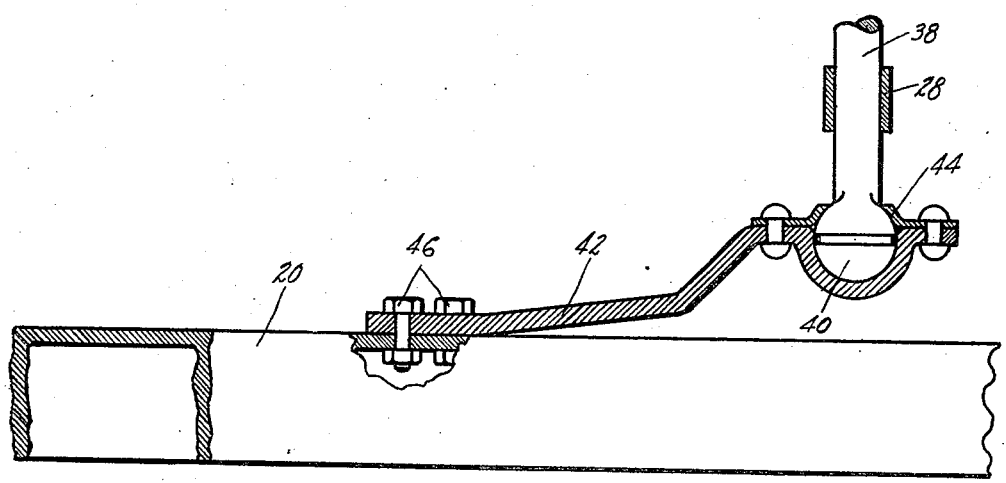
Fig. 3 is a horizontal section on the lines 3—3, Figs. 1 and 2, showing the connection of the shaft and flexible member.
Figure 4:
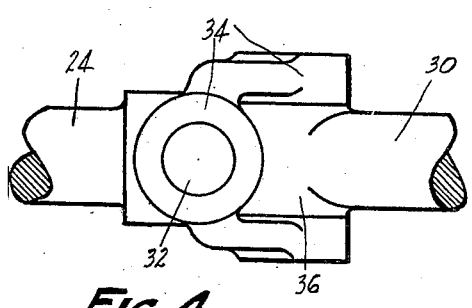
Fig. 4 is a top plan view of the adjacent ends of the shafts and the yoke connecting them.

In the arrangement illustrated, the brake includes shoes 10 engageable with a drum 12 rotating with a wheel on the spindle 14 of a knuckle 16 swivelled at one end of the axle 18. Front axle 18, with a rear axle (not shown) support through the usual springs a chassis frame 20. The brake is applied by means such as a double cam 22 rocked by a short brake-applying shaft 24 journalled in the backing plate 26 of the brake, and therefore swivelling with the wheel. The brake is applied by suitable connections through an arm 28 on a non-swivelling shaft 30 approximately coaxial with respect to shaft 24 when the wheel is straight ahead.

At right angles to shaft 24 is a vertically-extending cylindrical arm 32, on which is pivoted a sleeve at the center of a U-shaped yoke 34, the arms of which terminate in coaxial sleeves straddling and in alinement with a flattened sleeve 36 formed on the end of shaft 30. A horizontal pivot pin 38 extends through the three alined sleeves, the pin 38 and yoke 34 constituting a universal joint approximately at the swivelling axis of the wheel. The vertical axis of arm 32 intersects the swivelling axis at an acute angle, so that the pressure on the outer front brake is relieved in rounding a corner.

At its inner end, shaft 30 terminates in a ball 40 received in a socket, one half of which is pressed in the end of a flexible metal stamping 42, and the other half of which is in a separate cap 44 riveted or otherwise secured to the stamping. The stamping extends horizontally along the side member of frame 20, and is secured thereto at its opposite end by bolts or the like 46. The stamping forms an arm or flexible member which bends or distorts in a horizontal plane to compensate for spring movement causing axial movement of shaft 30 with respect to the frame. As these movements are of very small amplitude, the bending of stamping 42 is not sufficient to injure it.

While one illustrative embodiment has been described in detail, it is not my intention to limit the scope of the invention to that particular embodiment, or otherwise than by the terms of the appended claims.

I claim:

1. A vehicle having a swivelled wheel with a brake and an adjacent spring-supported chassis frame, and comprising, in combination therewith, a brake-applying shaft having a universal joint substantially in the swivelling axis of the wheel and terminating near the chassis frame, and an inherently-flexible part supporting the end of the shaft and secured to the frame and distorted to compensate for movement of the frame due to the springs.

2. A vehicle having a wheel with a brake and an adjacent spring-supported chassis frame, and comprising, in combination therewith, a brake-applying shaft terminating near the chassis frame, and an inherently-flexible part supporting the end of the shaft and secured to the frame and distorted to compensate for movement of the frame due to the springs.

3. A vehicle having a swivelled wheel with a brake and an adjacent spring-supported chassis frame, and comprising, in combination therewith, a brake-applying shaft having a universal joint substantially in the swivelling axis of the wheel and terminating near the chassis frame, and a flexible member lying along the side of the chassis frame and secured thereto and supporting the end of the shaft at a point spaced a substantial distance from the point where it is secured to the frame, to permit compensation for spring movement by distortion of said member.

4. A vehicle having a wheel with a brake and an adjacent spring-supported chassis frame, and comprising, in combination therewith, a brake-applying shaft terminating near the chassis frame, and a flexible member lying along the side of the chassis frame and secured thereto and supporting the end of the shaft at a point spaced a substantial distance from the point where it is secured to the frame, to permit compensation for spring movement by distortion of said member.

5. A vehicle having a swivelled wheel with a brake and an adjacent spring-supported chassis frame, and comprising, in combination therewith, a brake-applying shaft having a universal joint substantially in the swivelling axis of the wheel and terminating near the chassis frame, and a flexible member lying along the side of the chassis frame and secured at one end thereto and supporting the end of the shaft at its opposite end, to permit compensation for spring movement by distortion of said member.

6. A vehicle having a wheel with a brake and an adjacent spring-supported chassis frame, and comprising, in combination therewith, a brake-applying shaft terminating near the chassis frame, and a flexible member lying along the side of the chassis frame and secured at one end thereto and supporting the end of the shaft at its opposite end, to permit compensation for spring movement by distortion of said member.

7. A vehicle having a swivelled wheel with a brake and an adjacent spring-supported chassis frame, and comprising, in combination therewith, a brake-applying shaft having a universal joint substantially in the swivelling axis of the wheel and terminating near the chassis frame, and a flexible member lying along the side of the chassis frame and secured at one end thereto and supporting the end of the shaft at its opposite end, to permit compensation for spring movement by distortion of said member, together with a universal joint connecting the ends of the shaft and of said member.

8. A vehicle having a wheel with a brake and an adjacent spring-supported chassis frame, and comprising, in combination therewith, a brake-applying shaft terminating near the chassis frame, and a flexible member lying along the side of the chassis frame and secured at one end thereto and supporting the end of the shaft at its opposite end, to permit compensation for spring movement by distortion of said member, together with a universal joint connecting the ends of the shaft and of said member.

9. A vehicle having a wheel with a brake and an adjacent spring-supported chassis frame, and comprising, in combination therewith, a brake-applying shaft terminating near the chassis frame, and a flexible metal stamping secured at one end to the frame and supporting the end of said shaft at its opposite end.

10. A vehicle having a wheel with a brake and an adjacent spring-supported chassis frame, and comprising, in combination therewith, a brake-applying shaft terminating near the chassis frame, a metal stamping secured at one end to the frame and having a half socket pressed in its opposite end, the shaft terminating in a ball received in said socket, and a separate cap secured to the stamping and forming a cooperating half socket confining the ball.

11. A vehicle having a swivelled wheel with a brake, and comprising, in combination therewith, a short brake-applying shaft having a vertically-extending cylindrical arm approximately at the swivelling axis, a U-shaped yoke having a sleeve at its center pivoted on said arm and having its arms terminating in alined sleeves arranged on opposite sides of the axis of the brake-applying shaft, an operating shaft having a sleeve extending between and alined with the sleeves of said yoke, and a horizontal pivot pin connecting the three alined sleeves.

12. A vehicle having a swivelled wheel with a brake, and comprising, in combination therewith, a short brake-applying shaft having a vertically-extending cylindrical arm approximately at the swivelling axis, a U-shaped yoke having a sleeve at its center pivoted on said arm and having its arms terminating in alined sleeves arranged on opposite sides of the axis of the brake-applying shaft, and an operating shaft having a part extending between and horizontally pivoted to the sleeves of said yoke, together with a universal support for the end of the operating shaft.

13. A vehicle having a swivelled wheel with a brake, and comprising, in combination therewith, a relatively short brake-applying shaft swivelling with the wheel and a longer non-swivelling operating shaft approximately coaxial therewith in the straight-ahead position of the wheel, one shaft having a cylindrical arm extending at right angles at its end and the other having a flattened eye forming a sleeve arranged at the base of said arm, a U-shaped yoke having a sleeve at its center pivoted on said arm and having coaxial sleeves at its ends straddling and in alinement with the sleeve on said shaft, and a pivot pin connecting the three alined sleeves, the yoke and pin forming a universal joint approximately at the swivelling axis of the wheel.

14. In a motor vehicle, braking means for a wheel thereof, a brake-operating shaft extending inwardly from said braking means, and means for supporting the inner end of said shaft comprising a spring secured at one end to the frame of said vehicle and at the other end to the inner end of said shaft.

15. In a motor vehicle, braking means for a wheel thereof, a brake-operating shaft extending inwardly from said means and terminating adjacent a frame member of said vehicle, and means for supporting the inner end of said shaft comprising a spring secured to both said frame and to said shaft.

16. In a motor vehicle, braking means for a wheel thereof, a brake-operating shaft extending inwardly therefrom and terminating adjacent a frame member, and means for supporting the inner end of said shaft, said means comprising a spring secured at one end to said frame member and provided with means for pivotally supporting the inner end of said shaft at its other end.

17. In a motor vehicle, braking means for a wheel thereof, a brake-operating shaft extending inwardly therefrom and terminating in a ball end, and means for supporting the inner end of said shaft from the frame of said vehicle comprising a leaf spring rigidly secured to said frame at one end and provided with a socket for receiving said ball end of said shaft at its other end.

18. In a motor vehicle, braking means for a wheel thereof, a brake-operating shaft extending inwardly therefrom and terminating short of the frame of said vehicle, and means for supporting the inner end of said shaft to allow axial movement thereof relative to said frame, said means comprising a spring plate secured at one end to said frame in spaced relation thereto, and secured to the inner end of said shaft at its opposite end.

19. In a motor vehicle, braking means for a wheel thereof, a brake-operating shaft extending inwardly therefrom and terminating in a ball end, and means for supporting said ball end, said means comprising a spring plate secured at one end to the frame of said vehicle, and provided with resilient spring means at the other end thereof for pivotally socketing said ball.

20. In a motor vehicle, braking means for a wheel thereof, a brake-operating shaft universally connected to said braking means and extending inwardly therefrom and terminating in a ball end, and means for supporting the inner end of said shaft from the frame of said vehicle to allow axial movement thereof, said means comprising an elongated spring plate secured to said frame at one end and provided with an opening at the opposite free end, said ball end being centrally positioned in said opening with respect to said spring, and sockets secured to said spring for securing said ball end in said opening.

In testimony whereof, I have hereunto signed my name.

JOHN R. CAUTLEY.